United States Patent [19]

Point et al.

[11] Patent Number: 5,039,286

[45] Date of Patent: Aug. 13, 1991

[54] ELECTRICALLY-DRIVEN ROTARY PUMP

[75] Inventors: Jacques Point, Annecy; Pierre Joulia, Saint Jorioz, both of France

[73] Assignee: Rena S.A., Meythet, France

[21] Appl. No.: 546,317

[22] Filed: Jul. 2, 1990

[30] Foreign Application Priority Data

Jul. 7, 1989 [FR] France ............................ 89 09903

[51] Int. Cl.⁵ .............................................. F04B 1/26
[52] U.S. Cl. .............................. 417/424.1; 417/424.2; 417/423.3; 415/129
[58] Field of Search ............. 417/423.3, 423.7, 423.12, 417/423.14, 424.1, 424.2; 415/129, 131

[56] References Cited

U.S. PATENT DOCUMENTS 2,722,615 11/1955 Morganson .
3,821,567 6/1974 Erwin .

FOREIGN PATENT DOCUMENTS 0148343 7/1985 European Pat. Off. .

Primary Examiner—Leonard E. Smith
Assistant Examiner—Alfred Basichas
Attorney, Agent, or Firm—Browdy and Neimark

[57] ABSTRACT

A centrifugal pump, intended for pumping liquids, includes a impeller (1) connected in rotation to a rotor (7) with a permanent magnet that is part of a synchronous motor. The rotor (7) which has an axial clearance (L) is accommodated in a cylindrical housing (10) that is part of the body (9) of stator (8) of the motor. To orient the drive direction (F) of rotor (7) on the starting of the pump, complementary configurations are provided on the front face of rotor (7) away from impeller (1) and at the bottom of housing (10). These configurations comprise helicoidal surfaces (14, 16) connected at their ends by notches (15, 17).

4 Claims, 2 Drawing Sheets

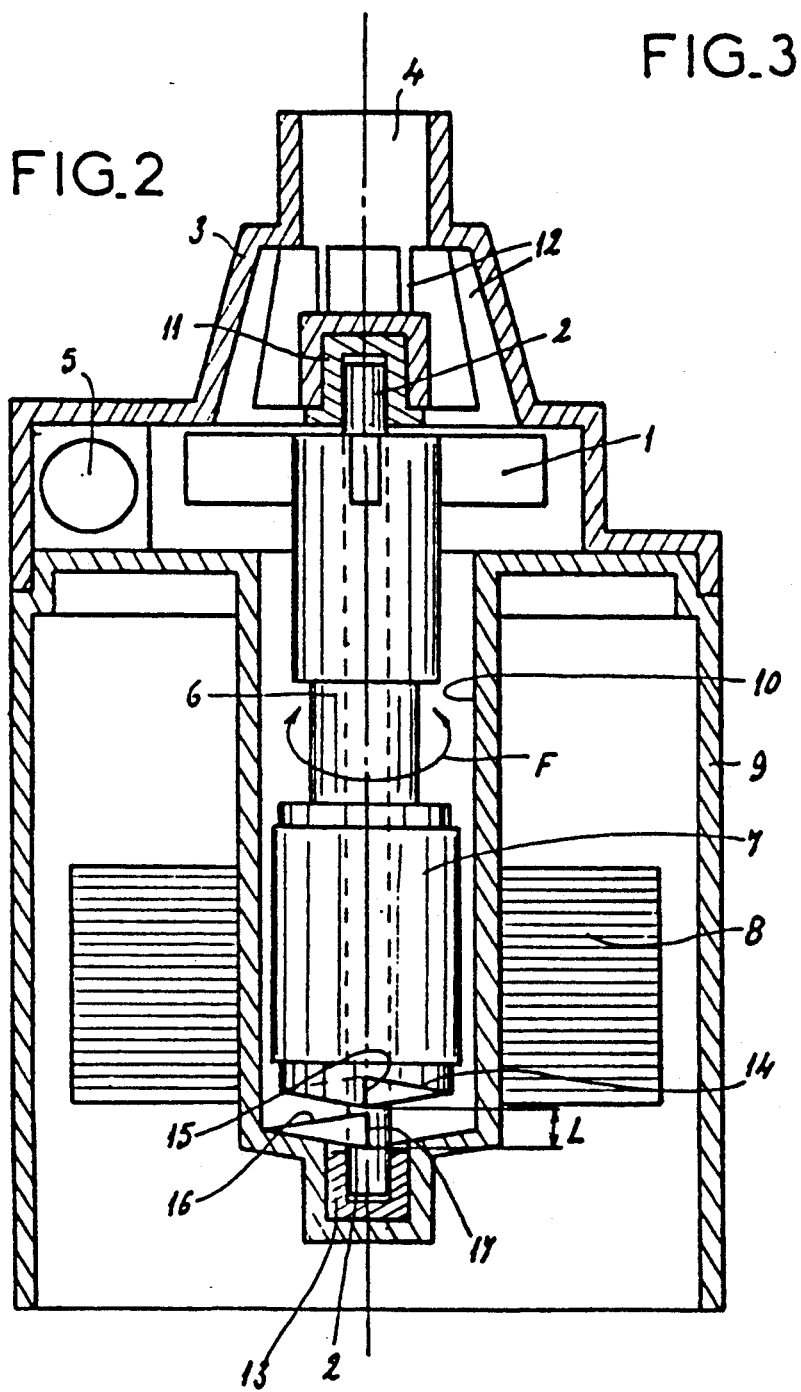
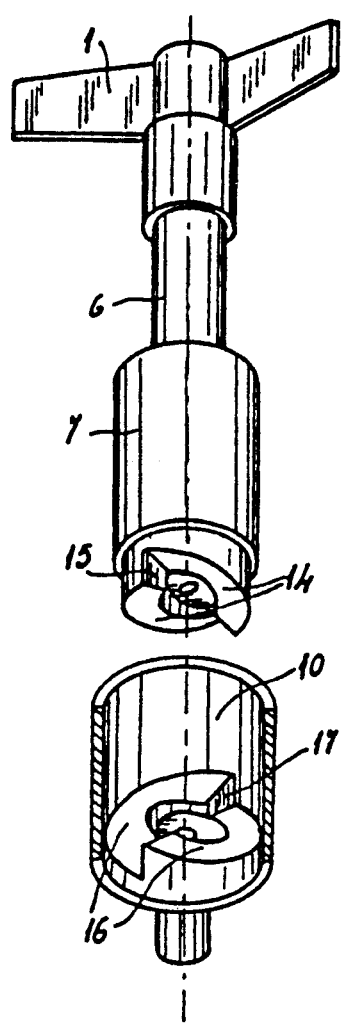

ELECTRICALLY-DRIVEN ROTARY PUMP

FIELD OF THE INVENTION

This invention pertains to an electrically-driven rotary pump intended for pumping liquids, for example for pumping water. More specifically, this invention pertains to a centrifugal pump that comprises a turbine, connected in rotation to a rotor with a permanent magnet, which is part of a synchronous electric motor, stator body of which is endowed with a generally cylindrical central housing accommodating the rotor.

BACKGROUND OF THE INVENTION

In such rotary pumps, the design of the synchronous motor does not allow definition of an invariable starting direction for the rotor, and thus a specific direction for the rotation of the impeller connected to the rotor. Consequently, the shape in which the turbine is made must allow an identical output regardless of its rotating direction, which corresponds to the direction in which the rotor starts when the pump is activated. In practice, because of this constraint, turbines are made with radial blades whose configuration does not allow optimization of the output of the electrically-driven rotary pumps of the type considered herein.

SUMMARY OF THE INVENTION

This invention aims to eliminate this problem by providing such an improved pump endowed with a simple and inexpensive device which orients the direction in which the rotor is driven on starting, and which thus makes it possible to optimize the shapes of the impeller and outgoing liquid in order to improve the output of the pump.

For this purpose, in the electrically-driven rotary pump according to the invention, complementary configurations are provided on the face of the rotor away from the impeller and turned towards the bottom of the housing of the body of the stator accommodating said rotor and also on the bottom of said housing itself. These complimentary configurations comprise at least one helicoidal surface and at least one notch connecting helicoidal surface ends, the rotor having an axial clearance.

In this way, the invention supplies a one-directional starting mechanism that is particularly simple and cost-effective because it does not require the addition of any other parts, and can easily result from shapes obtained directly by molding of plastic material. In particular, in the case of a rotor with a permanent magnet embedded therein molded of a plastic casing material, it suffices to make the helicoidal surface(s) and the notch(es) in the plastic material at the end of the rotor opposite the impeller.

Because the rotating direction of the impeller is clearly defined as the result of the arrangements provided by the invention, it becomes possible to give the blades of the impeller optimal profiled shapes depending on the direction of rotation, and to thereby optimize the shapes of the outgoing liquid, primarily creating a tangential outlet, which allows the pump an appreciable gain in power for an electric motor having given characteristics.

BRIEF DESCRIPTION OF THE DRAWING

In any event, the invention will be better understood through the description below in reference to the accompanying schematic drawing, showing one embodiment of said electrically-driven rotary pump as a nonrestrictive example:

FIG. 2 is a vertical sectional view similar to FIG. 1, but illustrating the operating position of the pump; and FIG. 3 is a partial perspective view of the pump, showing the impeller-rotor unit and the bottom of the housing accommodating the rotor.

DETAILED DESCRIPTION OF THE PREFERRED EMBODIMENT

Figure 1:
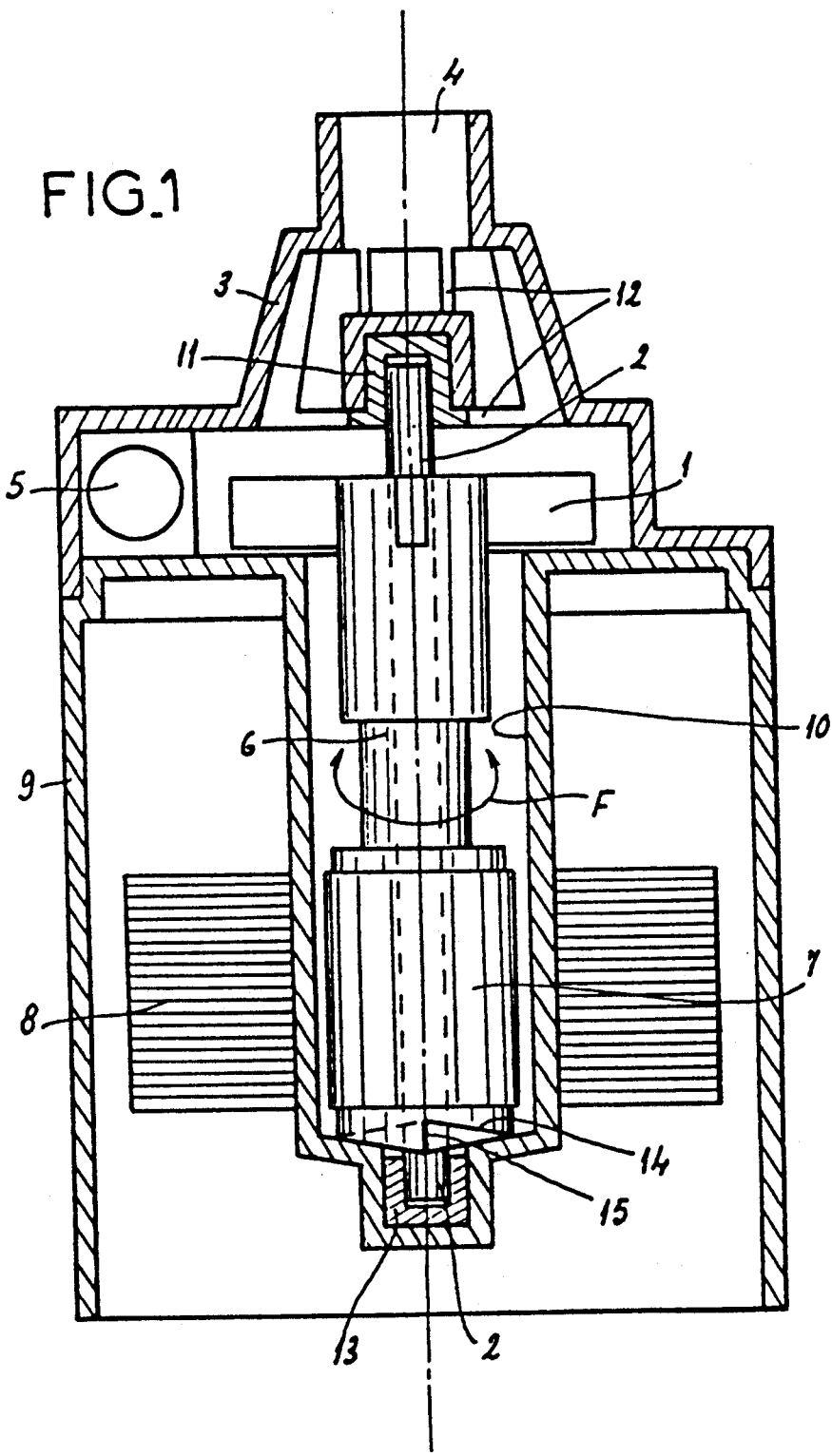
FIG. 1 is a vertical sectional view through the axis of a water pump according to this invention, shown in resting position.

The water pump shown in the drawing comprises a impeller 1 mounted to rotate around a shaft 2 in a casing 3 which comprises an axial water intake 4 and a tangential water outlet 5. Impeller 1 is connected for rotation through the intermediary of a short tubular shaft 6 to a rotor 7 being a permanent magnet, which is part of a synchronous electric motor including a stator 8. Such stator 8 is surrounded by a body 9 made of molded material, desirably plastic, endowed with a generally cylindrical central housing 10 coaxial with the axis of the pump and receiving rotor 7. The casing 3 of the impeller 1 is connected to one end of the molded body 9.

The unit formed by impeller 1, shaft 6 and rotor 7 is mounted not only to rotate around shaft 2, but also to be movable over a short distance in the longitudinal or axial direction of the shaft 2 which passes from one side of the impeller 1—rotor 7 unit to the other one end of the shaft 2 is held in a bearing 11 made solidary with casing 3 by radial arms 12, while its opposite end is held in a bearing 13 provided in the bottom of the housing 10.

According to the invention, the front face of the rotor 7 extending away from the impeller 1, thus facing towards the bottom of housing 10, has a special configuration that includes at least one helicoidal surface. In the example illustrated in the drawing, such configuration comprises two helicoidal surfaces 14, each extending over a half-turn, i.e. 180°, and interconnected at their ends by two diametrically-opposed walls or notches 15 (see especially FIG. 3).

The bottom of the housing 10 has a complementary configuration thus also comprising two helicoidal surfaces 16 each extending over a half-turn and interconnected at their ends with two diametrically-opposed walls or notches 17.

The aforementioned configurations are easily obtained by molding: helicoidal surfaces 14 and notches 15 can be formed in the plastic casing material duplicate molded with the permanent magnet of rotor 7 united with or embedded therein, while the helicoidal surfaces 16 and notches 17 are made in the molded material of body 9.

Operation is as follows:

At rest, as shown in FIG. 1, magnetized rotor 7 occupies an equilibrium position with respect to stator 8 in the axial direction, such that the front face of rotor 7 is in contact with the bottom of housing 10. Respective helicoidal surfaces 14 and 16 are thus in mutual contact, and notches 15 are located opposite notches 17.

When the electric motor is started, only one rotational direction indicated by an arrow F is possible for the impeller 1—rotor 7 unit because of the aforementioned configurations and the initial axial position of rotor 7. After a few revolutions of rotor 7 with rises on the helicoidal surfaces forming ramps and jumps over the notches, the pump creates its suction effect and impeller 1 is displaced axially, moving closer to the water intake 4. As shown in FIG. 2, the rotor 7 in this case is moved away from the bottom of housing 10, disengaging by a value L at least equal to the height of notches 15 and 17, L being the axial clearance of rotor 7. The impeller 1 rotor 7 unit can thus continue rotating freely around shaft 2, still in the direction of arrow F.

The pump described herein is applicable as an aquarium water circulation pump, among other uses.

Of course, the invention is not limited solely to the embodiment of said electrically-driven rotary pump described above as an example; on the contrary, it encompasses all variations of embodiments and applications following the same principle. In particular, the following variations would not depart from the framework of the invention:

With detailed modifications concerning, for example, the number of helicoidal surfaces and notches connecting the surfaces; the choice of only one helicoidal surface or more than two surfaces of this type generating no changes in operation on starting;

With a different manufacture, for example, making helicoidal surfaces and notches on a special component mounted on the rotor;

With modified turbine blade shapes depending on the desired operating characteristics;

With different uses of the pump, other than in the field of aquarium fish breeding and for liquids that can be other than water.

What is claimed is:

1. In an electrically-driven rotary centrifugal pump, for pumping liquids, comprising a impeller (1) connected in rotation to a rotor (7) having a permanent magnet that is part of a synchronous electric motor, whose stator (8) has a body (9) having a generally-cylindrical central housing (10) accommodating rotor (7), the improvement comprising:
    means to orient drive direction (F) of said rotor (7) on starting the pump said means comprising complimentary configurations on the front face of rotor (7) away from impeller (1) and turned towards the bottom of housing (10) accommodating said rotor (7) and on the bottom of said housing (10), said complementary configurations comprising at least one helicoidal surface (14, 16) and at least one notch (15, 17) connecting the helicoidal surface ends, rotor (7) having an axial clearance (L).

2. An electrically-driven rotary pump according to claim 1, wherein said configurations comprise, on the front face of rotor (7) and on the bottom of housing (1) accommodating said rotor, two said helicoidal surfaces (14, 16) each extending a half-turn and interconnected at their ends by two diametrically-opposed notches (15, 17).

3. An electrically-driven rotary pump according to claim 1, wherein said rotor (7) is molded of plastic material integral with a permanent magnet said helicoidal surface (14) and said notch (15) of the front face being made of said plastic material at the end of rotor (7) opposite said impeller (1).

4. An electrically-driven rotary pump according to claim 1, wherein said impeller (1) and rotor (7) are mounted to move in the longitudinal direction on a shaft (2) which passes through said unit from one side to the other and whose ends are held in bearings (11, 13).

* * * * *